Figure 2A:
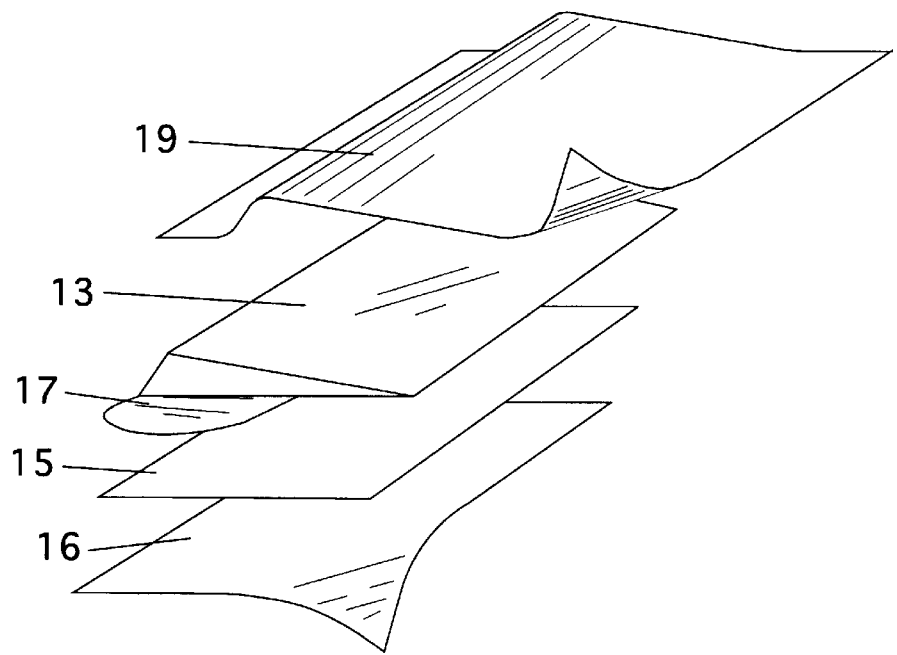

United States Patent
Duffy

[19]

[11] Patent Number: 6,128,850

[45] Date of Patent: Oct. 10, 2000

[54] DISPOSABLE-HERBICIDE APPLICATOR FOR WEED-CUTTING BLADES

[76] Inventor: Niall Duffy, 234 Pleasant St., Arlington, Mass. 02476-8134

[21] Appl. No.: 09/174,224

[22] Filed: Oct. 16, 1998

[51] Int. Cl.[7] .................................................. A01C 15/00
[52] U.S. Cl. .................................................................. 47/1.7
[58] Field of Search ........................ 47/1.5, 1.7; 30/123.3

[56] References Cited

U.S. PATENT DOCUMENTS

| | | |
|---|---|---|
| 773,743 | 11/1904 | Von Hoffmann . |
| 1,056,046 | 3/1913 | Myers . |
| 1,264,441 | 4/1918 | Rue . |
| 2,747,330 | 5/1956 | Simpkins . |
| 2,870,573 | 1/1959 | Scadden . |
| 4,716,677 | 1/1988 | Moore ........................................ 47/1.5 |
| 4,783,907 | 11/1988 | Ravaux ................................... 30/123.3 |
| 4,891,882 | 1/1990 | Bloom ..................................... 30/123.3 |
| 5,088,198 | 2/1992 | Drusiani ................................. 30/123.3 |
| 5,201,925 | 4/1993 | Itzel et al. .................................... 47/58 |
| 5,606,822 | 3/1997 | Dearhammer .............................. 47/1.7 |

OTHER PUBLICATIONS

Gunsolus, J.L. "Herbicide Mode of Action and Injury Symptoms" 1998, pp. 5–13.

*Primary Examiner*—Peter M. Poon
*Assistant Examiner*—Francis T. Palo
*Attorney, Agent, or Firm*—Hamilton, Brook, Smith & Reynolds, P.C.

[57] ABSTRACT

A disposable-herbicide wafer (13) with adhesive backing for attachment (15) to vegetation-cutting blades including those of weeding tools, anvil-type pruning shears, lawn mowers, grass whips and other devices that remove brush, weeds and other unwanted vegetation. As vegetation is cut, the herbicide wafer deposits herbicide on the rooted portion of the plant, thereby preventing plant re-growth.

32 Claims, 3 Drawing Sheets

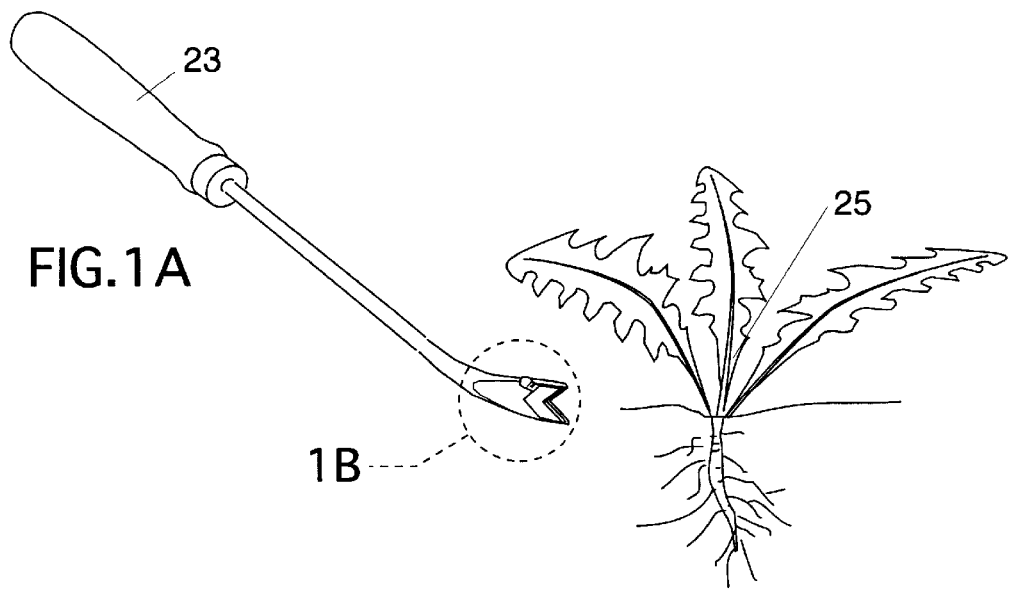
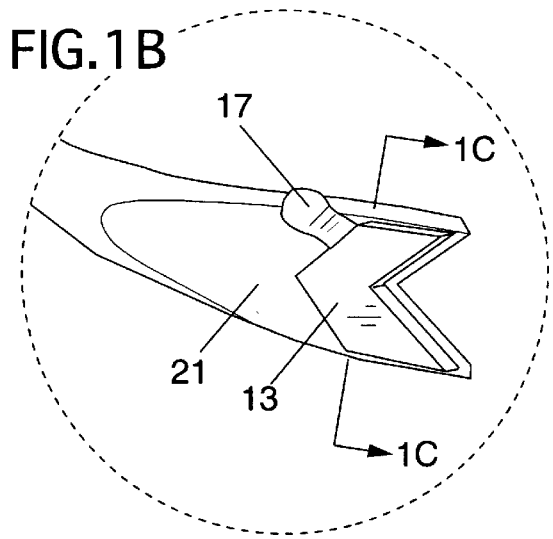
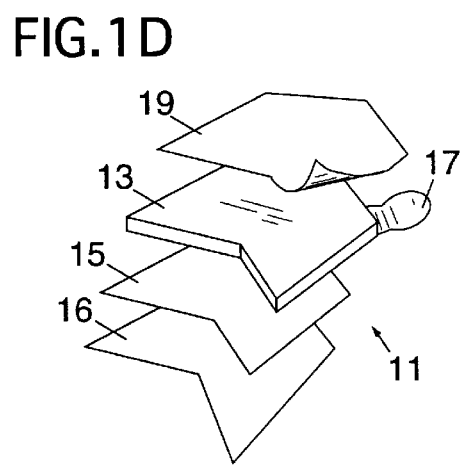
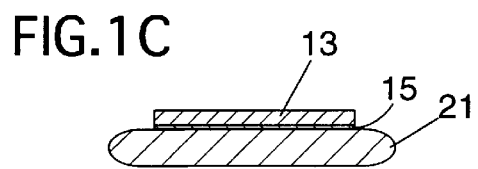

6,128,850

DISPOSABLE-HERBICIDE APPLICATOR FOR WEED-CUTTING BLADES

BACKGROUND—FIELD OF THE INVENTION

This invention relates to herbicide application devices specifically to a device that provides simultaneous herbicide application as the weed is cut.

BACKGROUND—DESCRIPTION OF PRIOR ART

A number of vegetation removal devices have been invented that remove weeds and brush by cutting the plant above the roots. Since the plant stem and roots remain intact, the plant may grow back. To prevent plant re-growth, inventors have created vegetation-cutting devices with liquid herbicide applicators positioned near the cutting blade. A number of patents have been issued for this type of weed removing device including U.S. Pat. No. 773,743 to Von Hoffman (1904), U.S. Pat. No. 1,056,046 to Myers (1913), U.S. Pat. No. 1,264,441 to Rue (1918), U.S. Pat. No. 2,747,330 to Simpkins (1956), U.S. Pat. No. 2,870,573 to Scadden (1959), U.S. Pat. No. 4,783,907 to Ravaux (1988), U.S. Pat. No. 4,891,882 to Bloom (1990), U.S. Pat. No. 5,088,198 to Drusiani (1992), U.S. Pat. No. 5,606,822 to Dearhammer (1997). These devices apply liquid herbicide to the plant at the cut thereby preventing plant re-growth. Since herbicide is applied only to plants that have been cut, inadvertent effects on the environment are minimized.

While these devices effectively remove unwanted vegetation, they are inconvenient to use and messy. Many require that a reservoir be filled with herbicide. This process may result in spilling and overfilling. Moreover, the herbicide applicator may inadvertently produce excess herbicide that can drip over desirable plants.

A further disadvantage of devices that administer liquid herbicide is that such devices are relatively expensive to manufacture. These are complex devices that comprise a vegetation-cutting device in combination with a liquid herbicide applicator. Consumers who already own the vegetation-cutting device may be reluctant to purchase a new vegetation-cutting device in order to gain the herbicide application capability. The expense of these devices makes them suitable only for large scale jobs and commercial applications.

As such, devices that simultaneously cut vegetation and apply herbicide have not gained acceptance with consumers for small scale applications in residential yards and gardens.

OBJECTS AND ADVANTAGES

Accordingly, several objects and advantages of my invention are:

(a) to provide a herbicide applicator component for weeding tools that prevents re-growth of rooted weed remnants (b) to provide a herbicide applicator component for vegetation-cutting tools that prevents vegetation re-growth (c) to provide a flexible-use herbicide applicator that can be used with a variety of existing weeding tools and vegetation removal devices (d) to reduce the expense of the herbicide applicator component of a plant-cutting device (e) to provide a herbicide applicator for which herbicide replacement is convenient and without mess (f) to provide a herbicide applicator that is light weight and not bulky (g) to provide a new line of herbicide products that appeal to a wide range of consumers including homeowners with casual gardening interests (h) to provide a new line of herbicide products that minimize inadvertent effects on the environment.

DRAWING FIGURES

FIGS. 1A to 1C show views of a disposable-herbicide applicator attached to the cutting blade of a weeding tool. FIG. 1A shows a perspective view as the weeding tool would be in use. FIG. 1B shows an enlargement of the region surrounding a herbicide applicator. FIG. 1C shows a sectional view of a weeding blade and a herbicide applicator. FIG. 1D is an exploded perspective view of a hebicide applicator as it would be before attachment to a weeding tool.

Figure 2B:
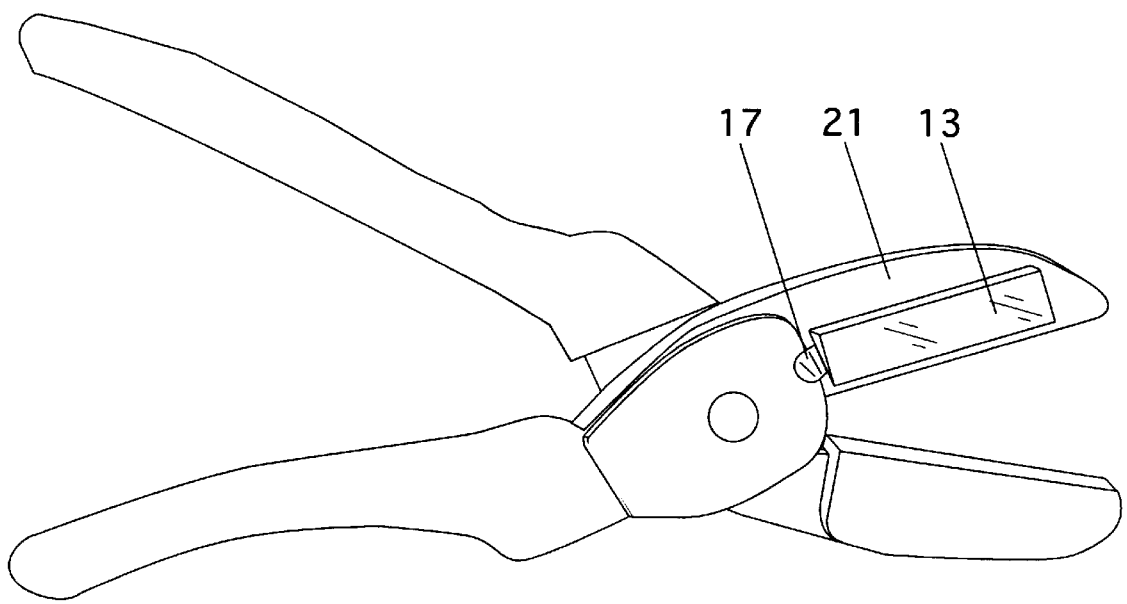

FIGS. 2A to 2B show a herbicide applicator embodiment being used with anvil-type shears. FIG. 2A is an exploded perspective view of a herbicide applicator as it would be before attachment to a shears. FIG. 2B is a perspective view of a herbicide applicator attached to shears as it would be in use.

Figure 3A:
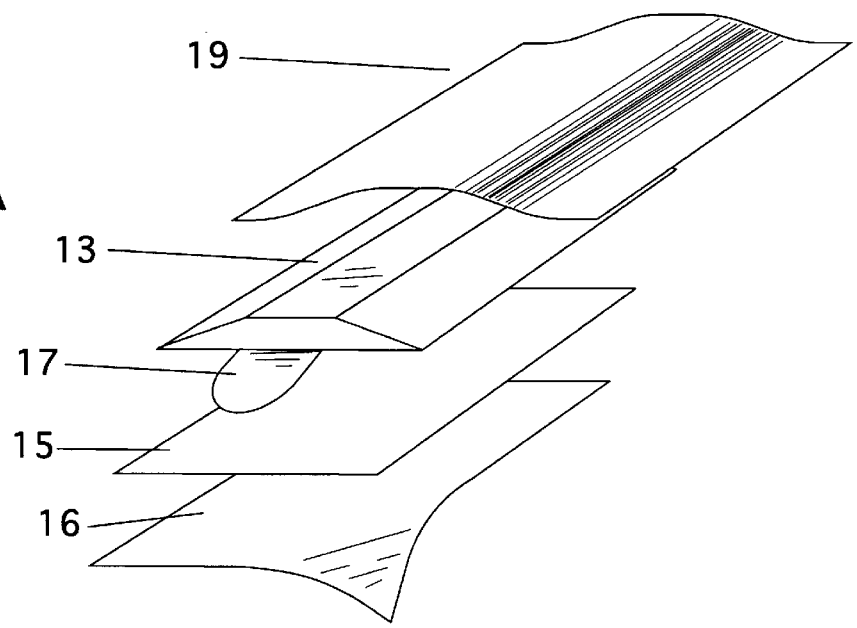
Figure 3B:
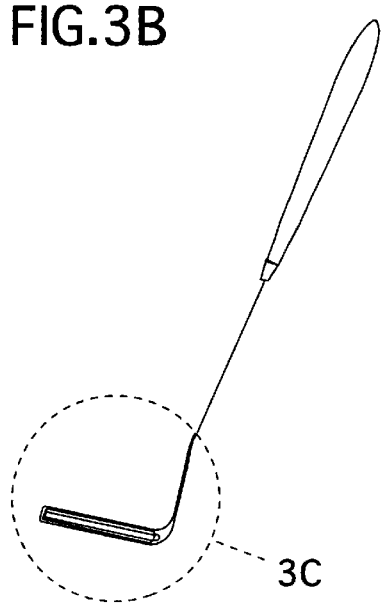
Figure 3C:
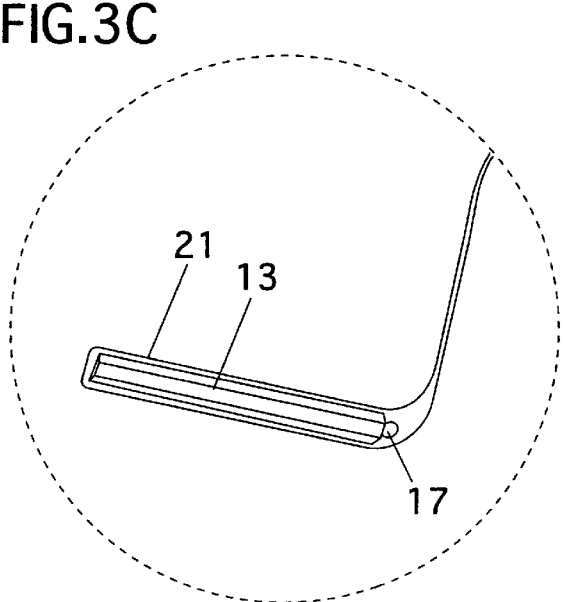

FIGS. 3A to 3C show a herbicide applicator being used with a grass whip. FIG. 3A shows an exploded perspective view of a hebicide applicator as it would appear before attachment to a grass whip. FIG. 3B shows a perspective view of a herbicide applicator as it would be in use. FIG. 3C shows an enlargement of the blade region.

REFERENCE NUMERALS IN DRAWINGS 11 disposable-herbicide applicator
13 herbicide wafer
15 adhesive
16 adhesive backing
17 pull-tab
19 peel-off protective covering
21 vegetation-cutting blade (not part of present invention)
23 weeding tool handle (not part of present invention)
25 weed (not part of present invention)

SUMMARY

In accordance with the present invention a disposable-herbicide applicator comprises a herbicide wafer with an attachment mechanism for securing the wafer to a vegetation-cutting blade.

DESCRIPTION—FIGS. 1 TO 3

A typical embodiment of the herbicide applicator is illustrated in FIG. 1A (herbicide applicator attached to weeding tool), FIG. 1B (enlargement of weeding tool cutting blade and herbicide applicator) and FIG. 1C (exploded view of disposable-herbicide applicator.) The herbicide applicator 11 comprises a wafer or pad 13, an adhesive 15, an adhesive backing 16, a pull-tab 17, and a peel-off herbicide covering 19. The peel-off covering 19 is shown in FIG. 1D, partially peeled back.

In use, the herbicide applicator is used with a vegetation-cutting tool such as the weeding tool shown in FIG. 1A. Wafer 13 is attached to a vegetation-cutting blade 21. The weeding tool has a handle 23 for grasping.

Wafer 13 consists of a material containing herbicide that transfers herbicide to vegetation when contact is made.

There are various possibilities with regard to the composition of wafer 13 including:

(a) Wafer 13 may consist of a gel suspension of herbicide that leaves a residue when moved in contact with vegetation.

(b) Wafer 13 may consist of a solid material containing herbicide that leaves a residue when moved in contact with vegetation.

(c) Wafer 13 may consist of a composition containing herbicide with a waxy consistency not unlike stick underarm deodorant.

(d) Wafer 13 may consist of dry or crystalized herbicide that is attached to a base. Herbicide is transferred to vegetation when the herbicide dissolves in moisture from the cut vegetation.

(e) Wafer 13 may consist of a liquid absorbant pad soaked with liquid herbicide. Liquid herbicide is released when pressure is applied to the pad.

(f) Wafer 13 may consist of an aggregate of granular herbicide. Herbicide is transferred vegetation when the herbicide dissolves in moisture from the cut vegetation.

Wafer 13 has a thin, flat body. The side of the wafer that faces the cutting blade is termed "back" and the side that contacts vegetation is termed "front." For some wafer compositions, reinforcement with a backing of paper or fabric is recommended to improve the structural integrity of the wafer.

Not all types of herbicide are effective for use in wafer 13. For example, some contact herbicides do not have the mobility required to move from the application site (the cut) to the roots. Herbicides that work by disrupting cell membranes such as Bipyridyliums and Diphenylethers are poor choices for the herbicide wafer.

Systemic herbicides that move within the plant via the phloem are generally effective for use in wafer 13. Some examples include growth regulators (Phenoxy Acetic Acids, Benzoic Acids, and Pyridines) and Amino Acid Synthesis Inhibitors (Imidazolinones, Sulfonylureas, Sulfonamides and glyphosate.)

The herbicide used in wafer 13 may exhibit selectivity in effectiveness according to the type of vegetation. For example, a herbicide that is effective against broad leaf plants is favored for applications intended for removing weeds from lawns. To indicate herbicide type, wafer 13 may be color-coded. For example, a green wafer might indicate that the intended use is for removal of weeds from lawns and a red wafer might indicate that the intended use is brush removal.

In the wafer embodiments (a), (b), and (c), wafer hardness is critical to applicator performance. The hardness of wafer 13 is selected to leave a suitable quantity of herbicide residue on the cut vegetation. If the wafer is too soft, the wafer will be depleted too quickly. If the wafer is too hard, herbicide residue on the plant will be inadequate to kill the roots.

The body of wafer 13 may be of variable thickness such as a wedge to improve the cutting motion. FIG. 2A shows an embodiment in which wafer 13 has a wedge shape. FIG. 2B shows wafer 13 attached to the cutting blade of an anvil-type pruning shears. The thin edge of wafer 13 is positioned near the cutting-blade edge.

Wafer 13 may have beveled edges to provide easier cutting and withdrawal from the weed. FIG. 3 shows an embodiment in which wafer 13 has beveled edges. FIGS. 3B and 3C show the beveled wafer attached to a grass whip.

The shape of the back of wafer 13 generally conforms to the shape of the cutting blade. For the weeding tool shown in FIG. 1 the wafer has a "V" shape to match the shape of the weeding-tool-blade edge. By contrast, the wafer embodiments of FIG. 2 and FIG. 3 have elongated rectangular shapes that are suitable for devices with straight cutting blades including anvil-type pruning shears, grass whips, lawn mower blades, and various types of brush removal equipment.

At least part of wafer 13 is covered with an adhesive 15 providing an attachment mechanism for securing wafer 13 to cutting blade 21. An adhesive backing 16 is provided to shield adhesive 15 until the wafer is to be used. The adhesive backing can be peeled off to expose the adhesive for making binding contact with the blade.

Wafer 13 has attached a pull-tab 17. Pull-tab 17 can be lifted and pulled to remove wafer 13 from the cutting blade. Pull tab 17 is positioned to minimize cutting-action interference and to reduce herbicide smearing onto the pull-tab. If the wafer embodiment includes the reinforcement described earlier, the pull-tab should be directly attached to the reinforcement.

The face side of wafer 13 is covered with a removable covering 19 such that hand contact with herbicide is prevented during attachment. In the preferred embodiment, covering 19 consists of a sheet of flexible material such as a metal foil, a plastic film, or coated paper. The sheet material is impermeable to substances in wafer 13 to prevent herbicide leaching. The flexible sheet can be peeled-off for easy removal after wafer 13 attachment and before use.

The disposable-herbicide applicator can be used with all manner of weed-removal devices and brush-removal devices including anvil-type pruners, scythes, brush removal machines and lawn mowers. Wafer 13 should be attached near the cutting-blade edge to ensure wafer contact with cut vegetation. Wafer 13 should be manufactured in shapes that conform to the shape of the blade edge for the intended weed-removal device. If the distance between the blade edge and wafer 13 is too great, the plant may not contact wafer 13.

While the disposable-herbicide applicator can be used with existing weeding and gardening tools, future gardening tools may be equipped with features that improve herbicide applicator suitability. Cutting blades may have recessed regions intended for receiving wafer 13 thereby reducing cutting interference by the herbicide wafer. Cutting blade 21 may have a special coating that promotes adhesion and facilitates herbicide-wafer removal. The cutting blade may provide an alternate means for wafer attachment such as a recessed slot, a clamp, or a hole for receiving a wafer-holding screw.

Further, the disposable-herbicide applicator may be used with tools that do not have cutting blades. Tools consisting of a handle and a region for receiving the herbicide wafer can be used to press the herbicide wafer onto unwanted plants. For this type of application, the wafer shape need not be thin.

The disposable-herbicide applicator enhances the effectiveness of weed removal and brush removal devices with little additional inconvenience. The present invention eliminates spills, overfills, and drips associated with liquid herbicide applicators that are incorporated into vegetation-cutting tools. The present invention adds a herbicide application capability to existing gardening tools and vegetation removal devices.

Operation

The disposable-herbicide applicator attaches to vegetation-cutting tools to provide a simultaneous herbicide application. The applicator can be used with existing vegetation-cutting devices as shown in FIGS. 1 to 3 and with vegetation-cutting devices specifically designed for receiving the disposable-herbicide applicator.

The adhesive backing is peeled off to expose the adhesive surface. The exposed adhesive surface is pressed against the cutting blade to affix wafer 13 to cutting blade 21. Attachment is made on the side of the blade that contacts the rooted part of the plant. After wafer attachment, protective covering 19 is removed to expose the herbicide bearing surface.

The vegetation-cutting device is used to cut unwanted vegetation in the usual manner. For the weeding tool shown in FIG. 1, the user grasps handle 23, and pushes the blade into the base of the weed, thereby severing the weed. As vegetation is cut, the stem or roots of the plant contact herbicide wafer 13. Herbicide residue remains on the plant thereby preventing plant re-growth. The plant is immediately removed, and is unlikely to grow back.

Wafer 13 is used repeatedly until the herbicide content is depleted. The depleted wafer is removed by grasping pull-tab 17 and pulling. The above steps are repeated to install a new disposable-herbicide applicator.

FIG. 1 shows the disposable-herbicide applicator being used with a weeding tool. The combination outperforms using herbicide alone and outperforms using a weeding tool alone. When the weeding tool is used alone, weeds re-grow. When herbicide is used alone, the herbicide kill process requires considerable time, from days to weeks, and dead weeds must be removed. By contrast, the weeding tool used in combination with the disposable herbicide applicator provides immediate weed removal and prevents weed re-growth. Since herbicide is applied only to the cut, inadvertent effects on the environment are minimized.

FIG. 2 shows the disposable-herbicide applicator being used with anvil-type shears. This combination is effective for removing heavier unwanted vegetation such as saplings, vines, and large weeds. As the vegetation is cut, the herbicide wafer deposits herbicide residue on the cut thereby preventing vegetation re-growth.

FIG. 3 shows the herbicide applicator being used with a grass whip. The grass whip is swung like a golf club to cut unwanted vegetation. As vegetation is cut, the herbicide wafer attached to the underside of the cutting blade contacts cut vegetation and deposits herbicide. This combination can be used for clearing heavy weed growth and light brush.

The herbicide applicator can also be used with other vegetation cutting devices. For example, attachment of the herbicide wafer to lawn mower blades provides a capability for removing light brush.

In each of the examples, the quantity of herbicide used is less than would be required if herbicide alone were used. Moreover, since the present invention eliminates herbicide drips and spills, inadvertent effects on the environment are minimized.

Conclusions, Ramifications, and Scope

Accordingly, the reader will see that the disposable-herbicide applicator of this invention provides an easy mechanism for herbicide application to the stem and roots of unwanted vegetation. Furthermore, the disposable-herbicide applicator is convenient and can be used with existing tools. The preferred embodiment incorporates the following components: adhesive 15, pull-tab 17, peel-off protective covering 19, and adhesive backing 16. The adhesive provides an easy, convenient attachment mechanism. The adhesive backing protects the adhesive until the wafer is to be used. The protective covering prevents hand contact with herbicide during attachment. The pull-tab allows easy removal after the herbicide is used up.

The ease of use and simplicity of the device make it attractive for small-scale residential applications. The device can be used with a variety of tools, including weeding tools, anvil-type pruning shears, lawn mowers, grass whips and other devices that remove brush, weeds, and other unwanted vegetation.

The disposable herbicide applicator provides a sensible approach for vegetation removal that is both environmentally sound and practical.

Although the description above contains many specificities, these should not be construed as limiting the scope of the invention but as merely providing illustrations of some of the presently preferred embodiments of this invention. For example, the wafer may be attached with clips that clamp onto the blade rather than adhesive.

Thus the scope of the invention should be determined by the appended claims and their legal equivalents, rather than by the examples given.

What is claimed is:

1. A herbicide applicator device for use with vegetation cutting tools, comprising:
   a wafer carrying a herbicide; and
   an adhesive covering at least part of the wafer for securing the wafer to a vegetation-cutting blade.

2. The herbicide applicator device of claim 1 further including an adhesive backing sheet extending over and against the adhesive, shielding the adhesive until the wafer is to be used.

3. The herbicide applicator device of claim 1 further including a removable covering whereby hand contact with the herbicide is inhibited during handling.

4. The herbicide applicator device of claim 3 wherein the removable covering comprises a peel-off sheet of flexible material.

5. The herbicide applicator device of claim 1 wherein the wafer further includes a pull-tab that can be grasped and pulled to facilitate removal of the wafer from the blade.

6. The herbicide applicator device of claim 5 further including a removable covering whereby hand contact with herbicide is prevented during handling.

7. The herbicide applicator device of claim 6 wherein said removable covering comprises a peel-off sheet of flexible material.

8. The herbicide applicator device of claim 2 further including a removable covering whereby hand contact with herbicide is prevented during handling.

9. The herbicide applicator device of claim 8 wherein said removable covering comprises a peel-off sheet of flexible material.

10. The herbicide applicator device of claim 1 wherein said herbicide wafer further includes a pull-tab that can be grasped and pulled for easy removal of said herbicide wafer.

11. The herbicide applicator device of claim 10 further including an adhesive backing sheet extending over and against the adhesive shielding the adhesive until the herbicide wafer is to be used.

12. The herbicide applicator device of claim 8 wherein said herbicide wafer further includes a pull-tab that can be grasped and pulled for easy removal of said herbicide wafer.

13. The herbicide applicator device of claim 3 wherein said herbicide wafer further includes a pull-tab that can be grasped and pulled for easy removal of said herbicide wafer.

14. The herbicide applicator device of claim 1 wherein the herbicide is a systemic herbicide.

15. The herbicide applicator device of claim 1 wherein the wafer is color-coded to identify the herbicide.

16. The herbicide applicator device of claim 1 wherein the wafer is shaped to conform to a cutting edge of the blade.

17. The herbicide applicator device of claim 1 wherein the wafer has a variable thickness.

18. The herbicide applicator device of claim 1 wherein the wafer has a beveled edge.

19. The herbicide applicator device of claim 1 further comprising a clip to secure the wafer to the blade.

20. The herbicide applicator device of claim 1 wherein the herbicide has a composition selected from the group of compositions containing: a gel suspension, a solid, a wax, a crystalline, a liquid, and granular.

21. A herbicide applicator device for use with vegetation cutting tools, comprising:
   a wafer including a herbicide;
   an attachment mechanism for securing the wafer to a vegetation-cutting blade; and
   a pull-tab attached to the wafer that can be grasped and pulled to facilitate removal of the wafer from the blade.

22. The herbicide applicator device of claim 21 wherein the attachment mechanism includes an adhesive covering at least part of the wafer.

23. The herbicide applicator device of claim 22 further including an adhesive backing sheet extending over and against the adhesive, shielding the adhesive until the wafer is to be used.

24. The herbicide applicator device of claim 21 further including a removable covering to inhibit hand contact with the herbicide during handling.

25. The herbicide applicator device of claim 24 wherein said removable covering comprises a peel-off sheet of flexible material.

26. The herbicide applicator device of claim 21 wherein the herbicide is a systemic herbicide.

27. The herbicide applicator device of claim 21 wherein the wafer is color-coded to identify the herbicide.

28. The herbicide applicator device of claim 21 wherein the wafer is shaped to conform to a cutting edge of the blade.

29. The herbicide applicator device of claim 21 wherein the wafer has a variable thickness.

30. The herbicide applicator device of claim 21 wherein the wafer has a beveled edge.

31. The herbicide applicator device of claim 21 further comprising a clip to secure the wafer to the blade.

32. The herbicide applicator device of claim 21 wherein the herbicide has a composition selected from the group of compositions containing: a gel suspension, a solid, a wax, a crystalline, a liquid, and granular.

* * * * *